June 1, 1965 G. B. FOSTER 3,187,256
SYSTEM FOR MONITORING AND INDICATING THE ECCENTRICITY OF
CIRCULAR OBJECTS IN BOTH A STATIC AND DYNAMIC CONDITION
Filed Sept. 9, 1960 2 Sheets-Sheet 1
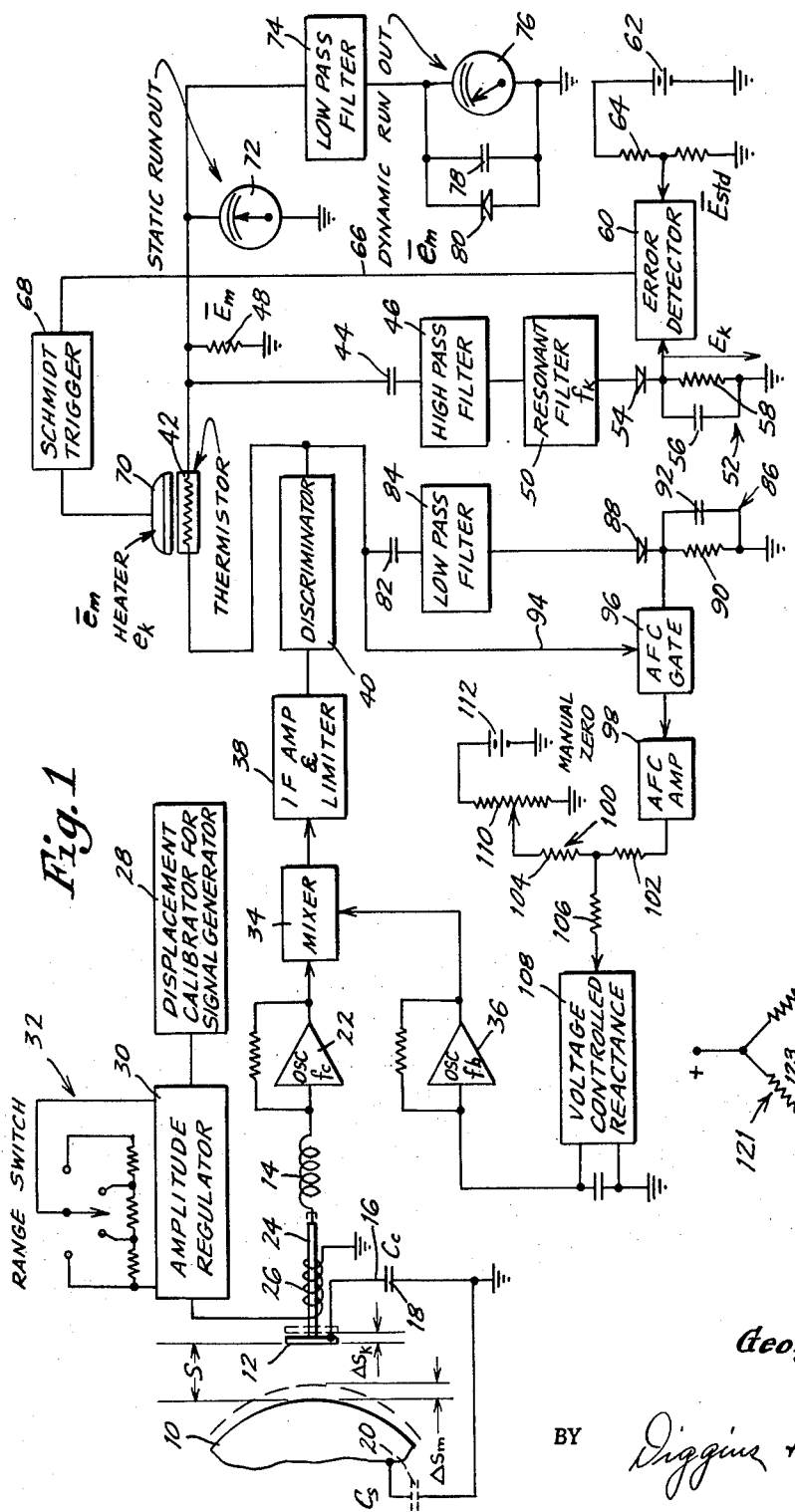
INVENTOR
George B. Foster
BY Diggins + LeBlanc
ATTORNEYS INVENTOR
George B. Foster
BY Diggins + Le Blanc
ATTORNEYS United States Patent Office 3,187,256
Patented June 1, 1965

3,187,256
SYSTEM FOR MONITORING AND INDICATING THE ECCENTRICITY OF CIRCULAR OBJECTS IN BOTH A STATIC AND DYNAMIC CONDITION
George B. Foster, Worthington, Ohio, assignor to Raydata Corporation, Worthington, Ohio, a corporation of Ohio
Filed Sept. 9, 1960, Ser. No. 54,987
19 Claims. (Cl. 324—61)

This invention relates to vibration measuring devices, and more particularly to a system for monitoring and indicating the eccentricity of circular objects in both a static and dynamic condition.

In the past it has been necessary to stop the machine in order to measure the eccentricity of a circular workpiece. The diameter of the object is measured with a micrometer or a micrometer dial while the object is slowly rotated by hand. The serious disadvantages of this method in terms of lost time and the requirement for skilled labor and careful visual measurement is readily apparent.

The present invention avoids the above-mentioned difficulty by providing a system for measuring the eccentricity of a workpiece without stopping the machine operation. An important feature of the present invention includes an arrangement whereby circular objects may be measured for eccentricity while in both the static and dynamic conditions; that is, both while stationary and when rotating at high speeds.

To measure the eccentricity of the workpiece under observation by the present invention, the change in spacing between the workpiece and a pickup plate which is fixed in space is utilized to vary the capacity of a series tuned oscillator and thereby frequency modulate the oscillator output. This change in frequency is analyzed and may be displayed as a function of workpiece eccentricity. Both the dynamic measurement made while the workpiece is rotating at high speed and the static measurement made while the workpiece is stationary or slowly rotated is independent of the separation between the pick up plate and the workpiece under observation. Self-calibration of the system at all times provides for increased accuracy and reliability.

It is therefore a primary object of the present invention to provide an improved run out monitor.

Another object of the present invention is to provide an improved vibration measuring device.

Another object of the present invention is to provide a device for monitoring and indicating the eccentricity of circular objects.

Another object of the present invention is to provide an improved device for measuring eccentricity both in the static and dynamic conditions.

Another object of the present invention is to provide a non-contacting capacitive probe system for measuring eccentricity independent of the separation between the pick up and the workpiece under observation.

These and further objects and advantages of the invention will be more apparent upon reference to the following specification, claims and appended drawings wherein:

FIGURE 1 shows in block form the over-all monitoring system of the present invention;

FIGURE 3 shows a modified thermistor control circuit usable in the system of FIGURE 1.

Figure 2A:
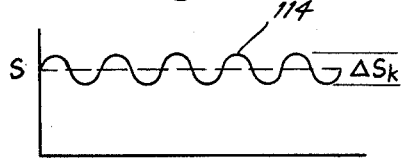
FIGURES 2A through 2I show waveforms and components at various points in the system of FIGURE 1.

The system of the present invention provides two eccentricity measurements for rotating circular objects. One measurement is taken while the object is rotating at its operational speed and the other is taken when the object is stationary or slowly rotated. In addition to the high speed eccentricity measurement, it is desirable to ascertain the absolute displacement as the workpiece is either stationary or slowly rotated in order to determine the angular location of maximum and minimum eccentricity.

In the monitoring system of the present invention illustrated in FIGURE 1, a circular rotatable workpiece to be measured is generally indicated at 10. Adjacent the workpiece is a pick up plate 12. Plate 12 is connected to an inductance coil 14 and by means of a flexible lead 16 to a grounded capacitor 18. The object or workpiece under study 10 exhibits a capacitance to ground indicated by capacitor 20. The tuned circuit which is formed by the inductance 14 and capacitors 18 and 20 as well as the capacitance between plate 12 and workpiece 10 is utilized as the frequency determining circuit in a radio frequency or carrier oscillator 22.

When the object or workpiece 10 vibrates, the distance between the workpiece and plate 12 varies. This changes the value of the capacitance in the frequency determining circuit of oscillator 22 and causes the frequency of oscillation to vary accordingly. Plate 12 is caused to oscillate between the solid and dashed line positions shown in FIGURE 1 by means of a drive armature 24 passing through a driving solenoid coil 26. Movement of the plate causes the output of the RF oscillator 22 to be frequency modulated.

The circuit constants of the inductance 14 and the capacitors associated therewith to form the tuned circuit, are so chosen that the frequency of oscillation of the oscillator 22 is preferably in the radio frequency range. The variation in frequency of the output of oscillator 22 in response to relative displacement between plate 12 and workpiece 10 constitutes frequency modulation with the relative distance indicated by S. The magnitude of the change in generated oscillator frequency (deviation) is determined by the magnitude of the relative displacement or movement between the plate 12 and the workpiece 10 while the rate of change at RF frequency is determined by the frequency of the relative motion between these same two elements.

The plate 12 carried by armature 24 is caused to vibrate by solenoid 26 driven by a probe drive oscillator 28 which feeds its signal through an amplitude regulator 30. Amplitude regulator 30 includes a range switch generally indicated at 32 for varying the amplitude range of the drive signal. The amplitude regulator is provided to insure a constant vibration amplitude of the plate 12 of the probe. This vibration of the probe plate 12 causes a variation in the frequency of the carrier signal of oscillator 22 with the magnitude of the change in carrier frequency being a function of the magnitude of the vibration and the rate of change of the carrier frequency being controlled by the frequency of the signal from the probe drive oscillator 28 through amplitude regulator 30.

The frequency modulated output of the RF oscillator 22 is fed to a mixer 34 which receives a beat signal from a beat frequency or local oscillator 36. The output of the mixer 34 is an intermediate frequency signal which is fed to an IF amplifier and limiter 38 and then to a frequency modulation detector or discriminator 40.

The output from the discriminator 40 passes through a heat controlled thermistor resistor 42 and through a coupling capacitor 44 to a high pass filter 46. Thermistor resistor 42 acts in conjunction with grounded resistor 48 to form a variable potentiometer to supply a variable A.C. signal to filter 46. Output from the high pass filter 46 is to a resonant filter 50 and a peak detector generally indicated at 52 comprising rectifier 54, capacitor 56 and resistor 58. The D.C. signal developed across one side of the peak detector 52 is supplied to one side of an error detector 60. A reference voltage from the battery 62 is supplied to the other side of the error detector by way of a potentiometer 64. An error signal from error detector 60 is coupled by way of lead 66 to a Schmitt trigger 68 supplying electrical energy to the thermistor heater 70.

The signal at the output of the discriminator developed across resistor 48 also passes to a static run out meter 72 and through a low pass filter 74 to a dynamic run out meter 76 having a suitable shunt capacitor 78 and rectifier 80.

A signal is taken directly from the discriminator output through a coupling capacitor 82 and low pass filter 84 to a frequency control detector generally indicated at 86 comprising a rectifier 88, a resistor 90 and capacitor 92. A portion of the discriminator output is by-passed by way of lead 94 around the detector and acts to open an automatic frequency control gate 96.

The D.C. signal developed across detector 86 passes through gate 96 and an automatic frequency control amplifier 98 to a voltage divider 100, comprising series resistors 102 and 104. The output arm 106 of the divider is connected to a voltage controlled reactance 108 forming a portion of the frequency controlling tuned circuit of local oscillator 36. Also connected to voltage divider 100 is a potentiometer 110 supplying voltage to the divider from a battery 112. Potentiometer 110 provides a manual zero control for the local oscillator more fully described below.

With the workpiece 10 in a fixed position the distance S between the workpiece and the pick up plate 12 is set at a particular arbitrary value and since the capacity between the probe plate and the body is determined by S, it too has a particular value. The frequency of the oscillator 22 is dependent upon the inductance 14 and the position of plate 12. The output of RF oscillator 22 is beat against the output of local oscillator 36 to produce an intermediate frequency $f_c - f_b = f_i$ in the mixer stage 34. The IF frequency signal is then amplified and limited in element 38 to hold constant the amplitude of the IF signal since the following discriminator stage 40 would otherwise respond to changes in amplitude of the intermediate frequency signal. The discriminator stage serves the usual frequency modulation detection function.

A displacement calibration signal from generator 28 is provided which operates at a frequency $f_k$ outside and preferably above the range of useful measurement frequency $f_m$ produced by the workpiece rotating or by periodic displacement occurring in the workpiece relative to the pick up plate 12. This relative displacement is indicated by the alternate solid and dashed line positions of workpiece 10 in FIGURE 1.

Figure 2B:
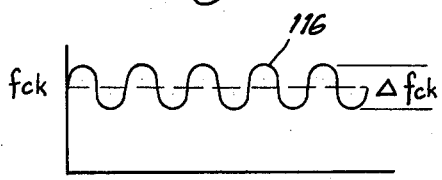

Transducer coil 26 actuates the armature 24 to vibrate plate 12 relative to the workpiece 10 so as to produce an alternating relative displacement variation having an amplitude $\Delta S_k$. This relative displacement occurs at the frequency $f_k$ of generator 28 and is illustrated in FIGURE 2A by the curve 114. Displacement of plate 12 by $\Delta S_k$ changes the capacity C of the tuned oscillator circuit and hence changes the frequency of the RF oscillator 22 so as to modulate it at the frequency $f_k$ of generator 28. This amount of change depends upon S and the frequency deviation $\Delta f_{ck}$ is illustrated by the curve 116 in FIGURE 2B.

The intermediate frequency $f_i$ is also changed by the amount of frequency change produced by the calibration displacement $\Delta S_k$. This change in IF frequency produces an output signal $e_k$ from the discriminator 40 at the calibration frequency $f_k$. The discriminator output is illustrated by the curve 118 in FIGURE 2C. The magnitude of the discriminator output $e_k$ is dependent upon the magnitude of $\Delta S_k$ and also the absolute separation S between the workpiece 10 and the plate 12.

The discriminator output $e_k$ passes by way of voltage divider 42, 48 through high pass filter 46 which is provided to remove any measurement signal component at a frequency $f_m$ and resonant filter 50 to remove any harmonics of $f_m$. The signal passes to peak detector 52. A D.C. voltage $E_k$ is produced across resistor 58 which is an analog of the variation in S of magnitude $\Delta S_k$.

The fixed voltage supply from battery 62 and voltage divider 64 provides a standard reference voltage $E_{std}$, which voltage is compared to $E_k$ by error detector 60. Error detector 60 may take any suitable form and by way of example only may be in the form of a chopper switch, as disclosed in copending application Serial No. 36,662, filed June 16, 1960. The output from the error detector passes to a Schmitt trigger circuit 68 with variations in error amplitude acting to vary the duration of the constant amplitude output pulses from the trigger circuit. As a result the energy supplied to heater 70 from the trigger circuit is varied in accordance with the error amplitude. This varies the resistance of thermistor resistor 42 and consequently controls the output voltage of the discriminator supplied to the two meters 72 and 76. Thus, for any value of S and $\Delta S_k$, the value of $E_k$ is always constant.

In operation, the static run out meter 72 is adjusted for center zero at zero D.C. output from the discriminator. The discriminator D.C. output is zeroed for any value of spacing S between probe plate 12 and workpiece 10 by varying the beat frequency $f_b$ of local oscillator 36. This is accomplished by varying the voltage to controlled reactance 108 by means of the manual zero control potentiometer 110. When the intermediate frequency $f_i$ is equal to the resonant or center frequency of the discriminator the average D.C. level of the discriminator output is zero. The static run out meter 72 therefore reads zero since it will not respond to signals of a frequency $f_k$, but rather responds to the average D.C. level. The frequency $f_k$ is beyond the range which the meter can follow.

Figure 2D:
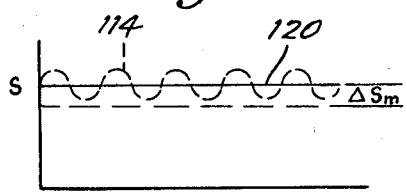

With the system properly zeroed for any arbitrary position of the probe plate and workpiece, the workpiece is then rotated to a new fixed position. Any eccentricity will produce a displacement $\Delta S_m$ which will change the output frequency of RF oscillator 22. The new fixed position of the workpiece produces a new value of S illustrated by the straight line 120 in FIGURE 2D. The variations in S caused by the drive coil 26 are in actuality superimposed upon the S curve in FIGURE 2D but are indicated by dashed lines for the sake of clarity. The difference in D.C. level between the zero position and the new fixed position of the workpiece is illustrated in FIGURE 2D by the deviation $\Delta S_m$.

The change in center frequency level caused by the displacement change $\Delta S_m$ produces a change in the center frequency of the IF signal supplied to the discriminator. As a result, the discriminator 40 produces an output having a D.C. component $E_m$ illustrated at 122 in FIGURE 2E. The magnitude of $E_m$ is proportional to the displacement $\Delta S_m$ and can be read by the static run out meter 72. The reading of meter 72 is therefore an indication of the static eccentricity of workpiece 10. The range of meter 72 is determined by the magnitude of $\Delta S_k$ in turn determined by the range of switch 32 varying the amplitude of the drive signal.

If the workpiece is rotated at some operational speed any eccentricity in the workpiece produces a dynamic displacement $\Delta S_m$ which is no longer constant or slowly varying but which varies at a frequency $f_m$ determined by the rotational speed of the workpiece. This change in S due to rotation of the workpiece is illustrated by the curve 124 in FIGURE 2F. The driving frequency $f_k$ is preferably chosen to be much higher than the rotational speed determining the frequency $f_m$.

Figure 2F:
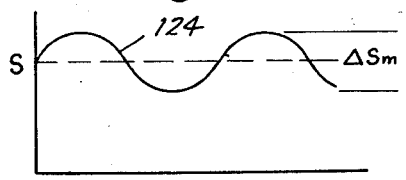
Figure 2G:
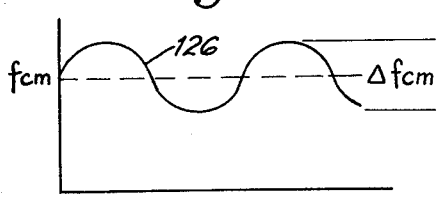
Figure 2C:
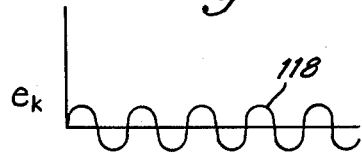
Figure 2E:
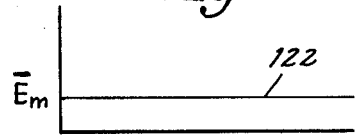
Figure 2H:
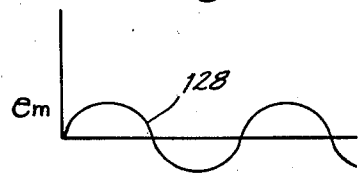
Figure 2I:
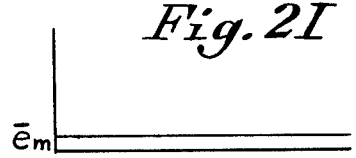

This change in separation distance $\Delta S_m$ will again produce a change in the frequency of the RF oscillator 22 of the form illustrated by curve 126 in FIGURE 2G, having a magnitude $\Delta f_{cm}$. The voltage output $e_m$ resulting from the $\Delta S_m$ displacement of FIGURE 2F is illustrated by the curve 128 in FIGURE 2H and occurs at the frequency $f_m$.

It is apparent that at higher speeds the frequency $f_m$ increases to the point where the static run out meter 72 can no longer follow the voltage $e_m$ illustrated at 128. Another circuit is therefore provided by the system comprising the low pass filter 74 and the peak reading dynamic run out meter 76. The low pass filter 74 is needed to remove the higher calibrating frequency $f_k$.

An important feature of the present invention includes an arrangement making it possible to take the dynamic run out readings completely independent of the separation S between the pick up plate and the workpiece under observation. As a result, the dynamic reading, as well as the static reading, can be zeroed so as to compensate for body capacitance changes and other variables including the fact that the static reading zero setting will usually be for a position which does not occur at the center of rotational eccentricity. In the present invention the freedom from variations in S is brought about by maintaining a constant IF frequency by means of an automatic-frequency control feedback arrangement. The automatic frequency control insures that the intermediate frequency $f_i$ is equal to the discriminator center frequency $f_o$. This control only works when the frequency of rotation is sufficient so that the static run out meter 72 can no longer accurately follow the displacement $\Delta S_m$.

In order to maintain a constant IF frequency the discriminator output $e_m$ is supplied to low pass filter 84 where the higher frequency components $f_k$ are removed. The voltage from the discriminator is also supplied by way of lead 94 to open gate 96. The RC network comprising resistor 90 and capacitor 92 is chosen of such a value as to develop a gating voltage only when $f_m$ acquires a specified minimum value. This value is at or close to the maximum frequency readable upon meter 72. The gating signal is therefore developed only when the frequency $f_m$ is such that the meter 72 can no longer follow $e_m$.

When gate 98 opens, the average D.C. level from the discriminator is measured in amplifier 98 and if the level is other than zero a correcting voltage is applied to the voltage controlled reactance 108. The correcting voltage from amplifier 98 is sufficient to overcome any setting of the manual zero control 110. This correcting voltage adjusts the value of $f_b$ from the local oscillator and consequently the intermediate frequency $f_j$ to maintain $f_i$ at the center or tuned frequency of the discriminator $f_o$.

FIGURE 3 shows a modified heater arrangement for thermistor 42. In FIGURE 3 a Wheatstone bridge generally indicated at 121 is connected between a positive voltage and ground. Connected across the opposite diagonal of the bridge is a rectifier 123 and an incandescent light or lamp 125. Heat from the lamp 125 is used to modify the value of thermistor resistance 42.

In FIGURE 3 the voltage $E_k$ is connected to the junction of two bridge arms by way of lead 127 and the reference voltage $E_{std}$ is connected to the junction of the other arms by way of lead 129. The standard voltage is preferably chosen so that curent flows at all times through the lamp 125. An increase in calibrating voltage $E_k$ causes more current to pass through the lamp, thus increasing the heat energy to the thermistor resistor 42. An increase in heat to the resistor causes its resistance to rise with the accompanying desired reduction in value of the voltage $E_k$. It is apparent that the bridge of FIGURE 3 may be used in place of the error detector 60, Schmitt trigger 68 and heater 70 of the system of FIGURE 1.

It can be seen from the above that the present invention provides a novel monitoring system for indicating the eccentricity of circular objects, both in a stationary or static condition and in a dynamic or rotating condition. An important feature of the present invention is the provision of an arrangement wherein both of these measurements can be made completely independent of the separation between the pick up plate and the workpiece under observation. Manual zeroing is provided for the static measurement while automatic zeroing or centering provides this independence during dynamic measurements. The automatic zeroing is brought about through a novel automatic frequency control feedback system which varies the local oscillator to maintain a constant IF frequency signal.

While described in conjunction with rotating bodies, it is apparent that the system of the present invention has general utility in measuring the static and dynamic displacements of all types of moving objects. The measuring system of the present invention is of the non-contacting type and exhibits extreme accuracy and reliability since the device to be measured is in no way altered or modified by the sensing signal. The frequency modulation detection and heterodyne circuit of the present invention is particularly suited to measurements of this type and produces a high degree of sensitivity in conjunction with probe measurements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. An eccentricity measuring device comprising transducer means positionable in proximity to an object subject to displacement, said transducer means being sensitive to a variation in energy existing in space, said variation in said energy being caused by changes in relative displacement between said transducer means and said object, said transducer means producing an electrical signal which is a function of said variation in said energy, a variable passive impedance coupled to said transducer means for changing the functional relationship between said variation in energy and said electrical signal, means for causing a cyclic variation in relative displacement of predetermined amplitude and frequency between said transducer means and said object whereby said transducer means produces a calibrating electrical output signal, and means coupled to said transducer means to receive said calibrating electrical output signal and to said passive impedance for varying said impedance in response to variations in said output signal to maintain said calibrating electrical output signal at a constant value.

2. An eccentricity measuring device according to claim 1 wherein said passive impedance is a variable resistor.

3. An eccentricity measuring device according to claim 2 wherein said variable resistor is part of a heat controlled thermistor.

4. An eccentricity measuring device comprising transducer means positionable in proximity to an object subject to displacement, said transducer means being sensitive to a variation in energy existing in space, said variation in said energy being caused by changes in relative displacement between said transducer means and said object, said transducer means producing an electrical signal which is a function of said variation in said energy, adjusting means coupled to said transducer means for changing the functional relationship between said variation in energy and said electrical signal, means for causing a cyclic variation in relative displacement of predetermined amplitude and frequency between said transducer means and said object whereby said transducer means produces an electrical output signal having a first calibrating component representative of said cyclic variation in relative displacement and a second measuring component representative of the remaining variations in relative displacement between said object and said transducer means, means coupled to said transducer means to receive said calibrating component and to said adjusting means for varying said adjusting means in response to variations in said output signal to maintain said calibrating electrical output signal at a constant value, and indicating means coupled to transducer means to receive said measuring component.

5. An eccentricity measuring device according to claim 4 wherein said indicating means is sensitive to the direction of said remaining variations in relative displacement.

6. An eccentricity measuring device, according to claim 5 wherein said indicating means registers variations in D.C. potentials, and A.C. indicating means coupled to said transducer means for registering A.C. variations in said measuring component.

7. An eccentricity measuring device according to claim 6 wherein said adjusting means comprises a thermistor offering a variable resistance to both A.C. and D.C. signals.

8. An eccentricity measuring device comprising a tuned circuit having one element thereof positionable in close proximity to an object subject to displacement, means for creating a field of energy in space which varies the tuning of said tuned circuit in response to relative movement between said element and said object, signal generating means for generating a signal at a frequency determined by said tuned circuit whereby the frequency of said generated signal is a function of variation in said energy at said element, means for causing a cyclic variation in relative displacement between said element and said object whereby said generating means produces an electrical output signal having a first calibrating component representative of said cyclic variations in relative displacement and a second measuring component representative of the remaining variations in relative displacement between said object and said element, a heat responsive variable potentiometer connected to the output of said signal generating means, and feedback means including a standard voltage comparator connected to the output of said potentiometer for heating said potentiometer in accordance with variations in the magnitude of said calibrating component to maintain the output of said calibrating component from said potentiometer at a constant value.

9. An eccentricity measuring device comprising a tuned circuit having one element thereof positionable in close proximity to an object subject to displacement, means for creating a field of energy in space which varies the tuning of said tuned circuit in response to relative movement between said element and said object, signal generating means for generating a signal at a frequency determined by said tuned circuit whereby the frequency of said generated signal is a function of variation in said energy at said element, means for causing a cyclic variation in relative displacement between said element and said object whereby said generating means produces an electrical output signal having a first calibrating component representative of said cyclic variations in relative displacement and a second measuring component representative of the remaining variations in relative displacement between said object and said element, a thermistor connected to the output of said signal generator, feedback means connected to said thermistor for maintaining the calibrating component output from said thermistor constant, and indicating means connected to the output of said thermistor for registering the measuring component output from said thermistor.

10. An eccentricity measuring device according to claim 9 wherein said calibrating component is of a different frequency than said measuring component.

11. An eccentricity measuring device according to claim 10 wherein said calibrating component is of a higher frequency.

12. An eccentricity measuring device comprising an oscillator having a frequency determining tuned circuit, said tuned circuit including as a part of the frequency determining capacitance a probe element positionable in proximity to an object subject to displacement whereby relative displacement between said element and said object causes a variation in the capacitance in said tuned circuit and thereby produces frequency modulation in said oscillator, means for producing a cycle variation in the position of said element whereby said oscillator is frequency modulated, a discriminator connected to the output of said oscillator, said cyclic variation causing a calibrating A.C. signal output from said discriminator, a variable resistor coupled to the output of said discriminator, means connected to said resistor responsive to variations in said calibrating signal for adjusting said resistor to maintain the calibration signal output thereof constant, and D.C. indicating means coupled to the output of said resistor.

13. An eccentricity measuring device according to claim 12 including A.C. indicating means connected through a low pass filter to the output from said resistor.

14. An eccentricity measuring device comprising an oscillator having a frequency determining tuned circuit, said tuned circuit including as a part of the frequency determining capacitance a probe element positionable in proximity to an object subject to displacement whereby relative displacement between said element and said object causes a variation in the capacitance in said tuned circuit and thereby produces frequency modulation in said oscillator, means for producing a cyclic variation in the position of said element whereby said oscillator is frequency modulated, a mixer receiving the output from said oscillator, a local oscillator supplying a beat frequency signal to said mixer to produce an intermediate frequency output signal from said mixer, a discriminator connected to the output from said mixer, said cyclic variation causing a calibrating A.C. signal output from said discriminator, a variable resistor coupled to the output of said discriminator, means connected to said resistor responsive to variations in said calibrating signal for adjusting said resistor to maintain the calibration signal output thereof constant, D.C. indicating means coupled to the output of said resistor, and manual means for adjusting the frequency of said local oscillator to produce an intermediate frequency signal from said mixer equal to the center frequency of said discriminator.

15. An eccentricity measuring device according to claim 14 including A.C. indicating means coupled to the output of said resistor through a low pass filter which blocks out said calibration signal.

16. An eccentricity measuring device according to claim 15 including automatic frequency control means comprising a frequency control detector connected between the output of said discriminator and said local oscillator for automatically controlling the frequency of said local oscillator in accordance with the average D.C. level of the output from said discriminator to maintain a constant intermediate frequency signal input to said discriminator.

17. An eccentricity measuring device according to claim 16 wherein the output from said discriminator includes a calibration signal component and a lower frequency measuring signal component and gate means coupled to the output of said discriminator for rendering said automatic frequency control means operative to override said manual control means only when the frequency of said measuring signal component exceeds the frequency registerable on said D.C. indicating means.

18. A measuring device comprising a mechanical to electrical transducer for transforming a physical displacement phenomenon to be measured into an electrical signal, means for imparting a known calibration variation of the physical displacement phenomenon to be measured to the input of said transducer whereby said transducer output comprises a measuring component and a calibration component, means for evaluating said measuring component, and feedback means responsive to variations in said calibration component for maintaining the mechanical to electrical transfer characteristic of said transducer constant.

19. A device according to claim 18 wherein said transducer senses variations in energy fields produced by said physical displacements.

References Cited by the Examiner
UNITED STATES PATENTS

| | | | |
|---|---|---|---|
| 2,671,135 | 3/54 | Woodward | 73—71.4 X |
| 2,747,095 | 5/56 | Boucke | 324—60 |
| 2,787,750 | 4/57 | Jones | 324—61 |
| 2,842,738 | 7/58 | Warnick | 324—61 |
| 2,935,681 | 5/60 | Anderson | 324—61 |
| 2,985,823 | 5/61 | Wright | 324—34 |

WALTER L. CARLSON, *Primary Examiner.*

SAMUEL BERNSTEIN, *Examiner.*